United States Patent [19]

Yamada

[11] Patent Number: 4,716,769

[45] Date of Patent: Jan. 5, 1988

[54] RADIAL FIELD ELECTROMAGNETIC FLOW METER

[75] Inventor: Teruo Yamada, Nagoya, Japan

[73] Assignee: Aichi Tokei Denki Co., Ltd., Aichi, Japan

[21] Appl. No.: 806,997

[22] Filed: Dec. 9, 1985

[30] Foreign Application Priority Data

Dec. 26, 1984 [JP] Japan ................. 59-197195

[51] Int. Cl.[4] ............................................. G01F 1/58
[52] U.S. Cl. ............................................. 73/861.12
[58] Field of Search .................... 73/861.11, 861.12

[56] References Cited

U.S. PATENT DOCUMENTS

| | | | |
|---|---|---|---|
| 2,583,724 | 1/1952 | Broding | 73/861.11 |
| 2,691,303 | 10/1954 | De Boisblanc | 73/861.11 |
| 3,911,742 | 10/1975 | Kolin | 73/861.11 |

FOREIGN PATENT DOCUMENTS

| | | |
|---|---|---|
| 0069456 | 1/1983 | European Pat. Off. . |
| 2632042 | 1/1980 | Fed. Rep. of Germany . |

*Primary Examiner*—Herbert Goldstein
*Attorney, Agent, or Firm*—Pollock, Vande Sande & Priddy

[57] ABSTRACT

A radial field electromagnetic flow meter includes a radial magnetic flux generator, a magnetic device surrounded by a fluid passage for fluid to be measured and electrically insulated magnetic poles separately positioned on a center line of the fluid passage, a tubular part surrounding a range including the mutually opposite magnetic poles of the magnet device through the fluid passage, and ribs radially crossing portions of the fluid passage between one end of the magnet device and a portion of the tubular part surrounding the one end of the magnet device, respective surfaces of the tubular portions and the ribs which come into contact with the fluid to be measured being electrically insulated, whereby the magnetic reluctance of the magnetic circuit of the magnet device can be reduced and the sensitivity of the electromagnetic flow meter can be improved.

2 Claims, 4 Drawing Figures

RADIAL FIELD ELECTROMAGNETIC FLOW METER

BACKGROUND OF THE INVENTION

The present invention relates to a radial field electromagnetic flow meter. The "radial field electromagnetic flow meter" is defined herein as an electromagnetic flow meter which comprises: a linear fluid passage for allowing an electrically conductive fluid to flow therethrough, having an annular cross-section and being surrounded by electrically insulating surfaces; a radial field generator for generating magnetic flux over the entire circumference in a space including a cross-section of the fluid passage in radial directions with respect to the center line of the space; a separating plate made of non-magnetic material, extended along at least a part of the radial magnetic flux, and projected into the fluid passage in parallel with the center line, the surfaces of both sides of the separating plate being electrically insulated from each other; and a pair of electrodes disposed in the foregoing space of the radial magnetic flux respectively, at portions close to mutually opposite ends of an angular range not including the separating plate; whereby a signal voltage proportional to the flow rate of the fluid to be measured is generated on the basis of an electromotive force induced across the pair of electrodes due to the movement of the electrically conductive fluid across the radial magnetic flux.

As prior art of such a radial field electromagnetic flow meter, there are those disclosed in Japanese Pat. Publication No. 56-54565, and U.S. Pat. No. 3,911,742. The magnetic circuit of the radial field generator used in these radial field electromagnetic flow meters is arranged so that none of its parts are made of ferromagnetic material with the exception of a magnet device having north and south magnetic poles arranged along the center line of the fluid passage.

In the conventional radial field electromagnetic flow meter described above, the magnetic circuit of the radial magnetic flux generator does not have any parts made of ferromagnetic material with the exception of the magnet device, so a disadvantage has existed in prior devices that the magnetic reluctance is a large amount and large energy is required to obtain the sufficient magnetic flux density required by the radial magnetic field.

SUMMARY OF THE INVENTION

It is therefore an object of the present invention to eliminate the disadvantage of the prior art as described above.

It is another object of the present invention to provide a radial field electromagnetic flow meter, with improved sensitivity through reduced reluctance of the magnetic circuit.

The electromagnetic flow meter according to the present invention is a radial field electromagnetic flow meter that comprises, as a main part of a radial field generator, a single magnet device surrounded by a fluid passage for fluid to be measured and electrically insulated from the fluid passage, north and south poles thereof being separately positioned on center line of the fluid passage. The radial field generator also comprises a tubular part surrounding the fluid passage surrounding the magnet device in a range including north and south magnetic poles, and ribs radially crossing a portion of the fluid passage between one end of the magnet device and a portion of the tubular part surrounding the one end of the magnet device, the tubular part and the ribs both being made of ferromagnetic material and the surface thereof which contacts the fluid to be measured, being electrically insulated from the fluid.

The magnetic flux of the magnet device (4, 5, 3, 2c, and 6) due to excitation in one direction, radially passes through the fluid passage (8) having an annular cross-section from the one end (5) (inner yoke) of the magnet device opposite to the other end (2), enters the main portion (1) (outer yoke) of the tubular part, and comes back to the one end (2c) of the magnet device through one end (2a) of the tubular part and the ribs (2b), as shown in FIG. 4. In case of reverse excitation, the direction of the magnetic flux is of course reversed. In each case, the magnetic flux portion in the fluid passage (8) is in the radial direction of the fluid passage (8) (as shown by arrows in FIG. 3), and the induced voltage is maintained in one circumferential direction over the entire fluid passage portion while the magnetic flux is maintained in one direction. Accordingly, by proper selection of the respective positions of the electrodes (10a) and (10b) on mutually opposite sides of the separating plate (9), an induced voltage, integrated substantially over the entire circumference $2\pi r$, can be derived as a signal voltage. Since the fluid passage (8) surrounding the magnet device (4, 5, 3, 2c, and 6) is surrounded by the tubular part which is made of magnetic material and the end (2c) of the magnet device is magnetically connected to the end (2a) of the tubular portion through the ribs (2b), no leakage of the magnetic flux occurs to the outside.

The above and other objects and features of the invention will appear more fully hereinafter from consideration of the following description taken in connection with the accompanying drawings.

DESCRIPTION OF THE PREFERRED EMBODIMENTS

Figure 1:
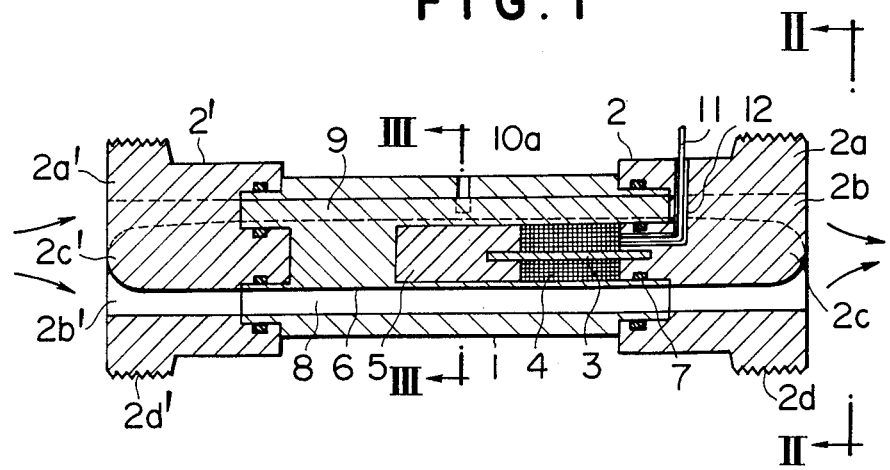
FIG. 1 shows an embodiment according to the present invention and is a longitudinal cross-section taken on line I—I in FIG. 2 extending in parallel with the flowing direction of the fluid.
Figure 2:
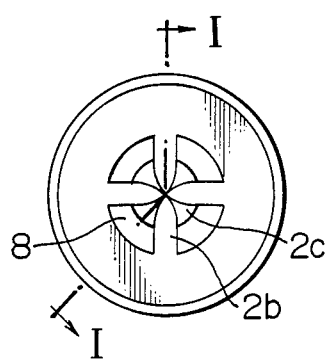
FIG. 2 is a side view taken on line II—II of FIG. 1.

In an embodiment shown in FIGS. 1 and 2, an additional electronic circuit is provided for processing a signal voltage induced across the electrodes and a housing for containing the electronic circuit, (not shown) cylindrical outer yoke 1 made of a soft ferromagnetic material, is fitted at one end of a connecting yoke 2 which serves as a mouth piece. The connecting yoke 2 is made of a soft ferromagnetic material and integrally constituted by a cylindrical short tubular portion 2a having substantially the same inner diameter as that of the outer yoke 1, four radial ribs 2b crossing a fluid passage, and a cylindrical portion 2c are disposed at the center of the fluid passage coaxially with the outer yoke 1. The right end of the cylindrical portion 2c in FIG. 1 is shaped in a substantially semispherical streamline, so as not to disturb the flow of the fluid. The ribs 2b act to mechanically and magnetically connect the short tubular portion 2a and the cylindrical portion 2c with each other. A male thread 2d is formed on the outer periphery of the short tubular portion 2a. The short tubular portion 2a of the connecting yoke 2 is fitted on the right end of the outer yoke 1 with a watertight O-shaped ring 5 interposed therebetween.

A mouth piece 2' made of non-magnetic material is fitted on the other end, of the outer yoke 1, and integrally constituted by a cylindrical mouth piece portion 2a' having substantially the same inner diameter as that of the outer yoke 1, four ribs 2b', and a cylindrical portion 2c' shaped in substantially semispherical streamline. A male thread 2d' is formed in the outer periphery of the mouth piece portion 2a'. The mouth piece 2' is fitted on the left end of the outer yoke 1 with an O-shaped ring interposed therebetween.

A core 3 made of a ferromagnetic material and a coil 4 would thereon constitute an electromagnet. A cylindrical inner yoke 5 made of a soft magnetic material, the core 3 of the electromagnet, and the cylindrical portion 2c of the connecting yoke 2 are arranged coaxially. A magnet cover 6 has a cylindrical external shape and is made of an electrically isnulating and nonmagnetic material. As shown in FIG. 1, a relatively shallow cylindrical hole formed in the magnet cover 6 at the left end thereof is fitted on the right end of the cylindrical portion 2c' of the mouth piece 2'. In a relatively deep cylindrical hole formed at the right end of the magnetic cover 6, the inner yoke 5, the core 3, and the coil 4 constituting the electromagnet are adjoiningly received in the order as described above from the exterior, and the left end of the cylindrical portion 2c of the connecting yoke 2 is fitted to the same cylindrical hole with an O-shaped ring 7 interposed therebetween. As shown in FIG. 1, the opposing ends of the electromagnet core 3 are coaxially fitted in the inner yoke 5 and the cylindrical portion 2c of the connecting yoke 2 respectively. Thus, a fluid passage 8 having an annular cross-section is formed between the cylindrical outer yoke 1 and the magnet cover 6 so that a fluid to be measured flows in the fluid passage 8. Each of the inner surface of the outer yoke 1 and the outer surface of the magnet cover 6 is convered with an electrically insulating coating. A separating plate 9, formed integrally with the magnet cover 6 and projected so as to abut on the inner surface of the outer yoke 1, is provided along the center line of and in a radial direction of the fluid passage 8 upper portion. The outer surface of the separating plate 9 is also covered with an insulating coating. Electrodes 10a and 10b are provided respectively on the mutually opposite surfaces of the separating plate, and a signal voltage across the electrodes is derived through insulated lead wires passed through the outer yoke 1 to the outside.

Figure 3:
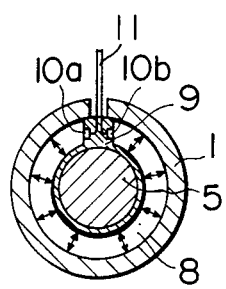
FIG. 3 is a cross-section taken on line III—III of FIG. 1.
Figure 4:
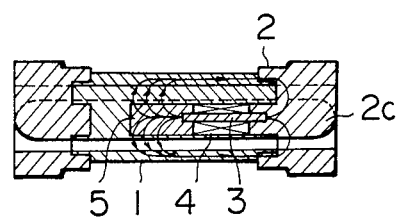
FIG. 4 is a reduced schematic diagram of FIG. 1, showing the path of the magnetic flux.

Lead wires 11 of the electromagnet coil 4 are watertight and are radially led out through a hole which penetrates through one of the ribs 2b of the connecting yoke 2. FIG. 3 illustrates the shape in cross-section of the magnetic circuit and the fluid passage. In FIG. 3, the distance between the electrodes 10a and 10b in the direction of potential is determined on the basis of the average radius r of the fluid passage 8 to be approximately 2 πr. While the exciting current is kept constant, the magnetic flux in the fluid passage 8 is limited to a single direction from the inner yoke 5 to the outer yoke 1 (or, alternatively, from the outer yoke to the inner yoke), so that the length of gap in the magnetic circuit is limited to a path from the outer peripheral surface of the inner yoke 5 to the inner peripheral surface of the outer yoke 1. Although an electromagnet is employed in the foregoing embodiment, a permanent magnet may be used to generate radial magnetic flux.

According to the present invention, all parts of the magnetic path except the gap are made of ferromagnetic material, so that magnetic reluctance due to the gap in the magnetic circuit is small and the sensitivity in measuring the flow rate is improved. Further, the excitation power can be reduced when the induced voltage is about the same degree as in the conventional case, so that in case batteries are used for performing excitation, the batteries may have reduced capacity. Thus, the required number of batteries may be reduced to half or less in comparison with the case where a non-magnetic tube is used instead of the outer yoke 1. Moreover, since the whole of the magnetic circuit is housed within the outer yoke which is used as a pipe for example, the magnetic circuit can be of smaller size and the magnetic flux is prevented from leaking to the outside. The magnetic circuit is not affected by any ferromagnetic body even if the latter closely approaches the former to thereby obtain stable accuracy. Moreover, since the mechanical strength is assigned to the pipe for example, the structure can be made simple.

I claim:

1. A radial field electromagnetic flow meter comprising:
    a tubular outer member (1) made of a ferromagnetic material having an inner electrically insulated wall;
    a radial magnetic field generating device disposed inside said outer member (1), having an outer electrically insulated wall;
    said radial magnetic field generating device including:
    an electromagnet having a core (3) made of a ferromagnetic material and a coil (4) wound thereon, an inner cylindrical ferromagnetic member (5) receiving one end of said core (3), and a connecting ferromagnetic member (2) for receiving an opposite end of said core (3), and interconnecting said magnetic field generating device with said outer member (1), said inner magnetic member (5) and said connecting member (2) being coaxial with said core;
    an annular passage for a flow of the fluid to be measured formed between said inner wall of said outer member and said outer wall of said field generating device;
    means for energizing said coil to produce said radial magnetic field;
    means for measuring said fluid flow by detecting the voltage induced by said radial magnetic field passing through said fluid in said annular passage between said inner and outer members.

2. A flow meter according to claim 1 wherein said connecting ferromagnetic member comprises:
    an inner cylindrical part (2c) for receiving said one end of said core (3);
    an outer tubular part (2a) coaxially extending at one end of said outer member (1); and
    a plurality of ribs (26) passing through said fluid passage for connecting said inner and outer parts (2a, 2c), said ribs having surfaces contacting said fluid electrically insulated.

* * * * *